United States Patent [19]
Townsend et al.

[11] Patent Number: 5,669,740
[45] Date of Patent: Sep. 23, 1997

[54] BARK MULCH HANDLING AND SPREADING APPARATUS

[75] Inventors: Randall L. Townsend; Michael T. Townsend; Tim L. Townsend, all of Cowley, Wyo.

[73] Assignee: Central Distributing, Cowley, Wyo.

[21] Appl. No.: 615,622

[22] Filed: Mar. 13, 1996

[51] Int. Cl.$^6$ .................................................. B65G 53/08
[52] U.S. Cl. .............................. 406/38; 406/37; 406/61; 406/135; 406/140; 406/166
[58] Field of Search .......................... 406/38, 39, 41, 406/57, 61, 135, 140, 164, 165, 166

[56] References Cited

U.S. PATENT DOCUMENTS

| | | | |
|---|---|---|---|
| 1,781,509 | 11/1930 | Gurney | 406/61 |
| 2,532,351 | 12/1950 | Wedebrock | 406/61 |
| 2,829,924 | 4/1958 | Renner | 406/41 |
| 3,601,267 | 8/1971 | Axling et al. | 214/10 |
| 3,604,757 | 9/1971 | White | 302/13 |
| 3,979,152 | 9/1976 | Morey et al. | 302/17 |
| 4,072,359 | 2/1978 | Lillkvist | 406/165 |
| 4,232,719 | 11/1980 | Payton | 144/34 R |
| 4,537,362 | 8/1985 | Zuloaga | 241/101.7 |

FOREIGN PATENT DOCUMENTS 1632850  2/1971  Germany .................... 406/165

*Primary Examiner*—Gary C. Hoge
*Attorney, Agent, or Firm*—Flanagan & Flanagan

[57] ABSTRACT

A bark mulch handling and spreading apparatus includes a platform adapted to be mounted on a mobile chassis, a receiving and conveying unit mounted on the platform having a hopper for receiving bark mulch and an auger along the bottom of the hopper for conveying the bark mulch to an outlet port of the unit, a blower mechanism mounted on the platform adjacent to the receiving and conveying unit for generating a flow of air past the outlet port of the receiving and conveying unit so as to entrain the discharging bark mulch in the flow of air, a spreading mechanism mounted on the platform adjacent to the receiving and conveying unit and adapted to receive the flow of air with entrained bark mulch from the outlet port of the receiving and conveying unit and to distribute the air flow entrained bark mulch to a selected discharge location, and a drive arrangement mounted on the platform for driving the auger of the receiving and conveying unit, the blower mechanism and a plurality of agitating members in the hopper of the receiving and conveying unit.

19 Claims, 3 Drawing Sheets

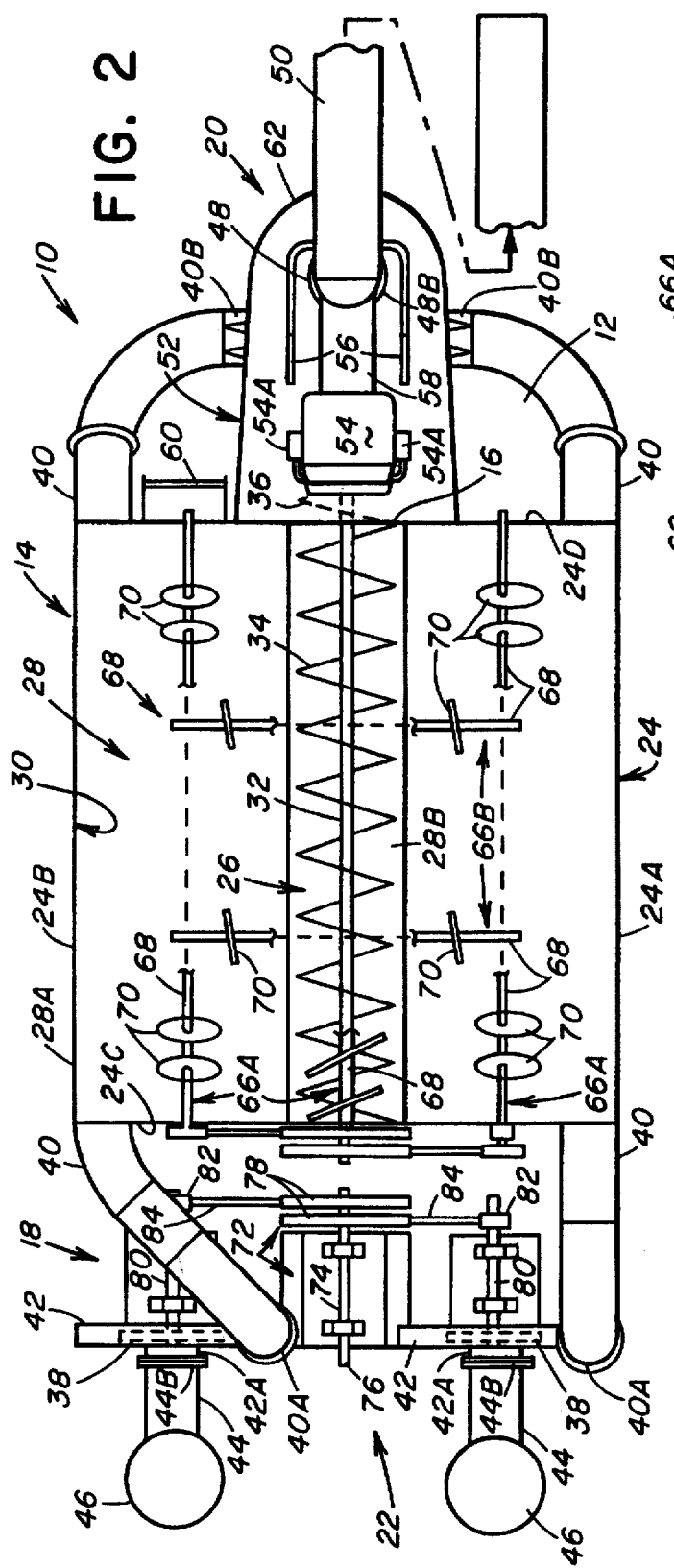
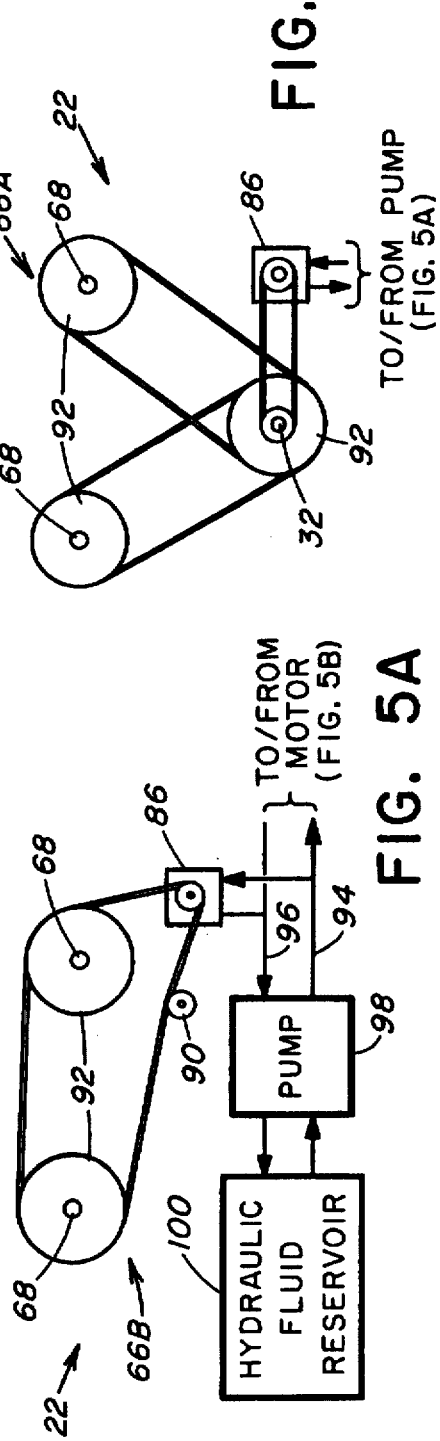

BARK MULCH HANDLING AND SPREADING APPARATUS

BACKGROUND OF THE INVENTION

1. Field of the Invention

The present invention generally relates to devices for handling and spreading particulate material and, more particularly, is concerned with a bark mulch handling and spreading apparatus having versatility in permitting the dispersion of bark mulch in a variety of applications and over a variety of areas.

2. Description of the Prior Art

It is often desirable to have a device which can handle and disperse particulate material in a variety of applications and over a variety of areas. A common form of particulate material is bark or wood chips which are often used as mulch to cover areas bordering highways, sidewalks and the like. It is often desirable to spread mulch by a means other than by hand if a large area needs to be covered.

Devices have been developed over the years for the handling of mulches. A representative example of such a device is disclosed in U.S. Pat. No. 3,979,152 to Morey et al. While the Morey apparatus appears to provide a means for handling and loading mulch onto a truck bed or the like, it and other like prior art devices appear to be limited to a single dedicated purpose and do not appear to be intended for use in spreading mulch in a variety of applications and over a variety of areas of any various shapes and sizes.

Consequently, a need still exists for a device or apparatus which overcomes the aforementioned problem in the prior art without creating any new problems in place thereof.

SUMMARY OF THE INVENTION

The present invention provides a bark mulch handling and spreading apparatus which is designed to satisfy the aforementioned need. The operative elements of the apparatus are positioned on a support platform such that their respective weights are relatively evenly distributed over the support platform and thus balance one another so as to enhance stability of the apparatus. The arrangement of the operative elements of the apparatus also provide versatility in permitting the dispersion of bark mulch in a variety of applications and over a variety of areas.

Accordingly, the present invention is directed to a bark mulch handling and spreading apparatus which comprises: (a) a platform adapted to be mounted on a mobile chassis; (b) means mounted on the platform for receiving bark mulch and conveying it to an outlet port of the receiving and conveying means; (c) a blower mechanism mounted on the platform adjacent to the receiving and conveying means for generating a flow of air past the outlet port of the receiving and conveying means so as to entrain in the flow of air the bark mulch being discharged from the outlet port; (d) a spreading mechanism mounted on the platform adjacent to the receiving and conveying means and adapted to receive the flow of air with entrained bark mulch from the outlet port of the receiving and conveying means and to distribute the air flow entrained bark mulch to a selected discharge location; and (e) a drive arrangement mounted on the platform for driving the receiving and conveying means and the blower mechanism.

More particularly, the receiving and conveying means includes a hopper and an elongated auger disposed in the hopper. The hopper has a pair of oppositely inclined side walls and a pair of front and rear end walls extending between and connected to the side walls and together therewith defining a bark mulch holding chamber. The chamber has a top portion with an inlet opening for receiving bark mulch, a bottom portion and the outlet port formed in the rear end wall adjacent to and aligned with the bottom portion of the chamber. The chamber is also wider at the top portion than at the bottom portion for promoting gravity flow of bark mulch from the top portion downwardly to the bottom portion. The elongated auger is rotatably mounted along the bottom portion of the chamber in the hopper. The auger has a discharge end extending through the outlet port of the hopper and is adapted to convey bark mulch through the chamber to the outlet port of the hopper.

Also, the blower mechanism includes at least one and preferably a pair of rotatable fans and at least one and preferably a pair of elongated transport pipe. Each fan is disposed in an adjacent spaced relation to the front end wall of the hopper and adjacent to one of a pair of opposite sides of the platform and is operable to generate a flow of air. Each transport pipe is coupled to one of the fans and extends along one of the pair of opposite sides of the platform to the rear end wall of the hopper such that discharge ends of the transport pipes located adjacent to the outlet port of the hopper approach the outlet port from opposite directions and and below the outlet port. The transport pipes are adapted to route separate flows of air from the respective fans to below the outlet port of the hopper.

Furthermore, the spreading mechanism includes an upright discharge tube and an upper distributing spout which is rotatably mounted to the upright discharge tube and which extends outwardly therefrom in a transverse relation thereto. The upright discharge tube has an inflow end in communication with the outlet port of the hopper for receiving a bark entrained upward flow of air therefrom and also has an outflow end displaced above the inflow end and connected to the upper distributor spout for expelling the bark entrained flow of air into the upper distributor spout for distribution therefrom to the discharge region.

The apparatus also includes a hollow enclosure mounted on the platform and extending between and in communication with the outlet port of the hopper and the inflow end of the upright discharge tube of the spreading mechanism. The hollow enclosure receives the discharge end of the auger extending from the hopper through the outlet port thereof and is adapted to guide the bark mulch from the auger in the chamber of the hopper to the inflow end of the upright discharge tube where the bark mulch becomes entrained in the upward flow of air from the blower mechanism passing into the upright discharge tube of the spreading mechanism.

Finally, the apparatus further includes a plurality of agitating members each having an elongated shaft rotatably mounted to the hopper and extending across the chamber thereof above the auger. Each agitating member has a plurality of disc-shaped stirring elements mounted to and spaced along the respective shaft. A first group of the agitating members extends substantially parallel to the auger while a second group of the agitating members extends transverse to the auger. The first and second groups of agitating members are further disposed at different elevations across the chamber of the hopper.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 a top plan view of the apparatus of FIG. 1.

FIGS. 5A and 5B are diagrams of an arrangement for driving agitating members of the apparatus.

DETAILED DESCRIPTION OF THE INVENTION

Figure 1:
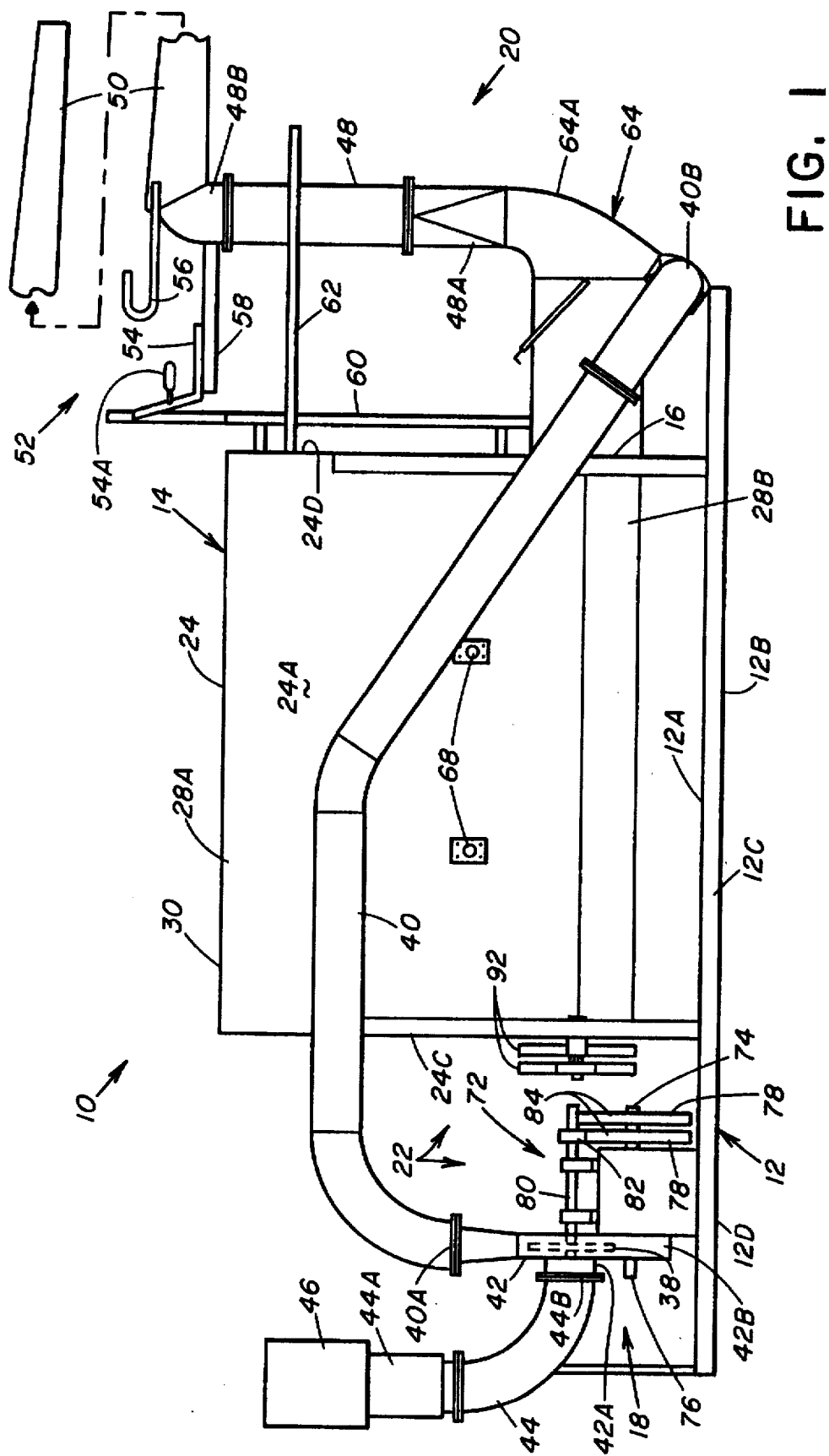
FIG. 1 is a side elevational view of a bark mulch handling and spreading apparatus of the present invention.
Figure 4:
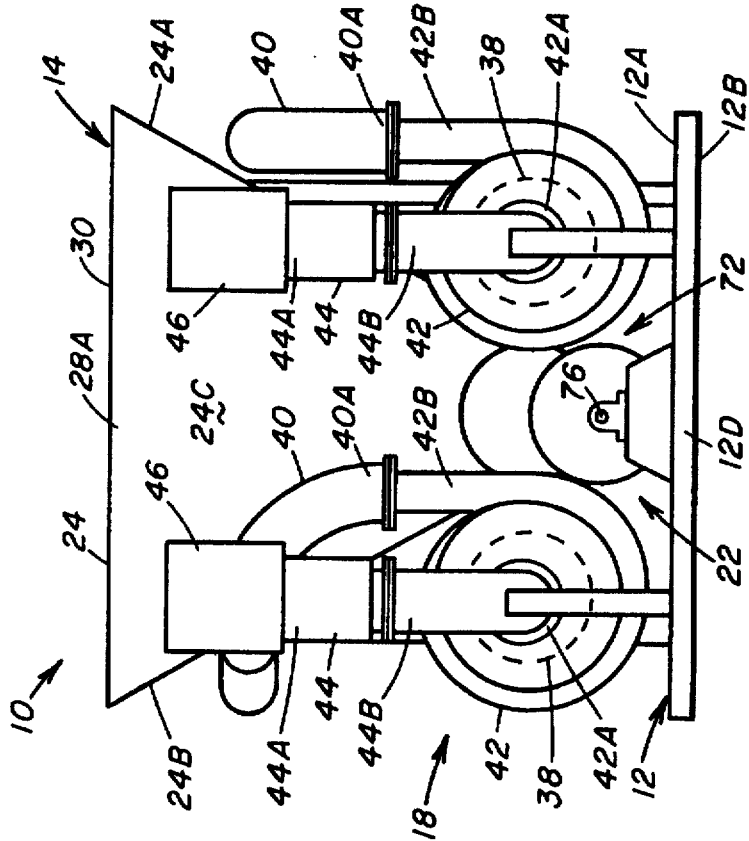
FIG. 4 is a front elevational view of the apparatus of FIG. 1.
Figure 3:
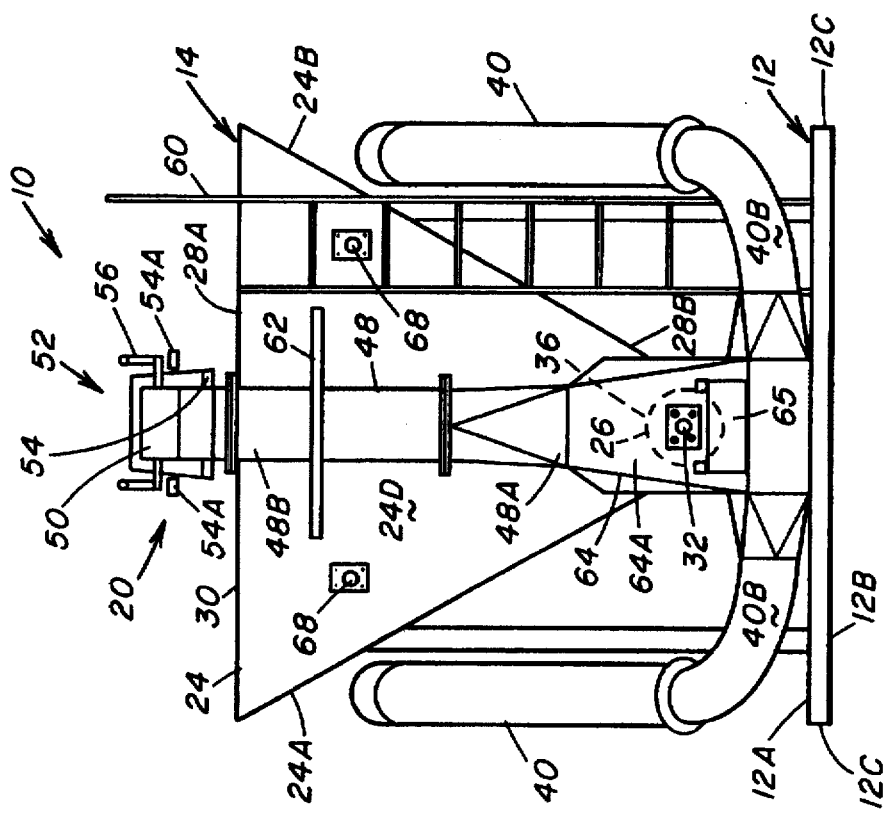
FIG. 3 is a rear elevational view of the apparatus of FIG. 1.

Referring to the drawings and particularly to FIGS. 1 and 2, there is illustrated a bark mulch handling and spreading apparatus, generally designated 10, of the present invention. Basically, the bark mulch handling and spreading apparatus 10 includes a platform 12 adapted to be mounted on a mobile chassis (not shown), and a receiving and conveying unit 14 mounted on the platform 12 for receiving bark mulch therein and for conveying the bark mulch to an outlet port 16 thereof. For the purposes of brevity, the term "bark mulch" as used herein is representative of all suitable types of particulate materials that can be handled by the apparatus 10 of the present invention.

The apparatus 10 also includes a blower mechanism 18 mounted on the platform 12 adjacent to the receiving and conveying unit 14 for concurrently generating flows of air to the outlet port 16 of the receiving and conveying unit 14 for entraining bark mulch being discharged from the outlet port 16, and a spreading mechanism 20 mounted on the platform 12 adjacent to the outlet port 16 of the receiving and conveying unit 14 and the location of convergence of the air flows from the blower mechanism 18 and adapted to receive the air flows with entrained bark mulch from the outlet port 16 and distribute the air flow entrained bark mulch to a selected discharge location. Further, referring also to FIG. 5, the apparatus 10 includes a drive arrangement 22 mounted on the platform 12 and being adapted to drive the receiving and conveying unit 14 and the blower mechanism 18 as well as other operative components described later on.

Referring to FIGS. 1–4, the platform 12 of the apparatus 10 preferably is flat and is generally rectangular in shape and has a pair of opposite top and bottom flat surfaces 12A, 12B. The top flat surface 12A supports the above-mentioned elements of the apparatus 10 mounted thereon. The platform 12 at its bottom flat surface 12B is preferably mounted upon a mobile chassis but can also be mounted to a stationary chassis for additional support for and/or transport of the apparatus 10.

The receiving and conveying unit 14 of the apparatus 10 includes a hopper 24 and an elongated auger 26 disposed in the hopper 24. The hopper 24 has a pair of oppositely inclined side walls 24A, 24B and a pair of front and rear end walls 24C, 24D extending between and connected to the side walls 24A, 24B and together therewith defining a bark mulch holding chamber 28. The chamber 28 has a top portion 28A forming a top inlet opening 30 for receiving bark mulch, such as being delivered thereto by using a suitable loader mechanism, a bottom portion 28B forming an elongated bottom trough in the hopper 24, and the outlet port 16 formed in the rear end wall 24D adjacent to and aligned with the bottom portion 28B of the chamber 28. The chamber 28 is also wider at the top portion 28A than at the bottom portion 28B for promoting gravity flow of the bark mulch from the top portion 28A downwardly to the bottom portion 28B of the hopper chamber 28.

The auger 26 is rotatably mounted at least at the front end wall 24C and extends therebetween along an imaginary lengthwise center line of the bottom trough 28B of the chamber 28. The auger 26 has an elongated cylinder 32 and a flight 34 spirally wrapped around and extending the full length of the cylinder 32. The auger 26 further has a discharge end 36 extending through the outlet port 16 of the hopper 24 at the rear end wall 24D thereof. The auger 26 is adapted to convey the bark mulch through the chamber 28 from the front end wall 24C to the outlet port 16 in the rear end wall 24D of the hopper 24.

The blower mechanism 18 of the apparatus 10 preferably includes a pair of rotatable fans 38 mounted on the platform 12 and a pair of elongated transport pipes 40 each connected at an inlet end to a respective one of the rotatable fans 38. The blower mechanism 18 of the apparatus 10 has at least one fan 38 and preferably two fans 38 apart from one another at one end of the platform 12 and at least one and preferably two transport pipes 40 extending along the exteriors of the opposite side walls 24A, 24B of the hopper 24 and along the opposite sides 12C of the platform 12. Each fan 38 is mounted on the platform 12 and disposed in an adjacent spaced relation to the front end wall 24C of the hopper 24 and is operable to generate a flow of air. Each transport pipe 40 is coupled to one of the fans 38 and extends along the exteriors of the opposite side walls 24A, 24B to the rear end wall 24D of the hopper 24 adjacent to the outlet port 16 thereof. Each transport pipe 40 is thereby adapted to route the flow of air from a respective one of the fans 38 to the outlet port 16 of the hopper 24.

The blower mechanism 18 further includes a separate housing 42 for each fan 38 in which one of the fans 38 is rotatably mounted, and an air intake pipe 44 connected to an axial inlet 42A of the housing 42. The housing 42 is preferably annular in shape and provides space for rotation of the fan 38 enclosed therein. The housing 42 and enclosed fan 38 are mounted in a substantially upright position adjacent to the hopper 24 and are in substantially perpendicular relation to the platform 12. The housing 42 further has a tangential outlet 42B coupled to an end of the transport pipe 40. The air intake pipe 44 has an inlet opening 44A at an upper end and an outlet opening 44B at the opposite lower end coupled to the axial inlet 42A of the housing 42. The intake pipe 44 is substantially cylindrical in shape and extends forwardly and then upwardly away from the housing 42. The intake pipe 44 has a screen 46 extending across the inlet opening 44A to prevent the intake of large particulate material in the air which could cause disruption of the operation of the fan 38 enclosed within the housing 42.

Each transport pipe 40 more particularly has a pair of opposite front and rear openings 40A, 40B at opposite ends thereof. The front opening 40A of the transport pipe 40 is coupled to the tangential outlet 42B of the housing 42. The rear opening 40B of the transport pipe 40 is coupled to the spreading mechanism 20 at a point rearwardly of, below and adjacent to the outlet port 16 of the hopper 24. The transport pipe 40 is substantially cylindrical in shape and extends upwardly away from the housing 42, rearwardly along the external side of one of the side walls 24A, 24B of the hopper 24, downwardly and then inwardly to the point of coupling with the spreading mechanism 20.

The spreading mechanism 20 of the apparatus 10 includes an upright discharge tube 48 and an upper distributing spout 50 which is rotatably mounted to the upright discharge tube 48 and which extends outwardly therefrom in a transverse relation thereto. The upright discharge tube 48 has an inflow end 48A in communication with the outlet port 16 of the hopper 24 and rear openings 40B of the respective transport pipes 40 for receiving a bark entrained upward flow of air therefrom and also has an outflow end 48B displaced above the inflow end 48A and connected to the upper distributing spout 50 for expelling the bark entrained flow of air into the upper distributing spout 50 for distribution therefrom to the discharge region.

The spreading mechanism 20 further includes an operator steering control portion 52 mounted to the upper end 48B of the upright discharge tube 48 and extending forwardly in the opposite direction from the upper spout 50 and in transverse relation to the upright discharge tube 48. The operator steering control portion 52 preferably includes a seat 54 and a pair of handle bars 56 mounted on opposite sides of the upper distributing spout 50. The seat 54 is mounted to a support member 58 which is mounted to and extends forwardly from the upright discharge tube 48. The seat 54 faces toward the spout 50 and has a pair of opposite arm rests 54A attached thereto. Each of the handle bars 56 extends forwardly toward the seat 54 for gripping thereof by an operator seated thereon. A ladder 60 is mounted to the platform 12 and the rear end wall 24D of the hopper 24 so that the operator of the apparatus 10 can easily climb up to and down from the seat 54. A ledge 62 is mounted to and extends rearwardly from the rear end wall 24D of the hopper 24 below the seat 54 for resting the feet of the operator thereon.

The apparatus 10 also includes a tubular enclosure 64 supported on the platform 12 and mounted to and extending between and in communication with the outlet port 16 of the hopper 24 and the inflow end 48A of the upright discharge tube 48 of the spreading mechanism 20 with the enclosure 64 shaped to receive the discharge end 36 of the auger 26 so as to thereby guide the bark mulch from the auger 26 in the chamber 28 of the hopper 24 to the inflow end 48A of the upright discharge tube 48 where the bark mulch becomes entrained in the upward flow of air passing into the upright discharge tube 48 of the spreading mechanism 20 from the rear openings 40B of the transport pipes 40. The enclosure 64 has a rear end wall portion 64A rotatably mounting the discharge end 36 of the auger 26 and also having a cleanout door 65 pivotally mounted to the end wall portion 64 of the enclosure 64.

The apparatus 10 further includes a plurality of agitating members 66 each having an elongated shaft 68 rotatably mounted to the hopper 24 and extending across the chamber 28 thereof above the auger 26. Each agitating member 66 also has a plurality of disc-shaped stirring elements 70 mounted to and spaced along the respective shaft 68. A first group 66A of the agitating members 66 extends substantially parallel to the auger 26. A second group 66B of the agitating members 66 extends substantially transverse to the auger 26. The first and second groups 66A, 66B of agitating members 66 are further disposed at different elevations across the chamber 28 of the hopper 24.

Referring to FIGS. 1, 2, 5A and 5B, the drive arrangement 22 of the apparatus 10 for operating the auger 26, the agitating members 66, the fans 38 of the blower mechanism 18. As seen in FIGS. 1 and 2, for powering the blower mechanism 18, the drive arrangement 22 includes a power takeoff drive transmission 72 mounted on the front end 12D of the platform 12 between the laterally spaced fans 38. The transmission 72 includes a drive shaft 74 coupled at its forward end to a power takeoff shaft 76, a pair of drive sheaves 78 mounted in tandem relation on the rear end thereof, a pair of driven shafts 80 mounted adjacent to the fans 38 and at forward ends drivingly coupled thereto, a pair of driven sheaves 82 each attached to the rear end of one of the driven shafts 80, and a pair of drive belts 84 each entrained over one of the drive sheaves 78 and one of the driven sheaves 82. A tractor or similar towing vehicle used to pull the mobile chassis on which the apparatus 10 is mounted supplies the rotary power to rotate the power takeoff shaft 76 of the drive arrangement 22. Alternatively, an engine could be provided to replace the power takeoff shaft as the power source for the blower mechanism 18 so that the apparatus 10 does not need to rely on the towing vehicle as the source of power. Still further, the apparatus 10 could be provided on the chassis of a self-propelled vehicle.

As seen in FIGS. 2, 5A and 5B, for powering the auger 36 and agitating members 66, on the exterior of the hopper 24 the drive arrangement 22 provides a pair of hydraulic motors 86 drivingly coupled, via drive chains 88 extending past idlers 90, to respective one of the gears 92 attached to ends of the shafts 68 of the first and second groups of agitating members 66A, 66B and the auger 26. The hydraulic motors 86, in turn, are connected by pressure and return hydraulic lines 94, 96 to a hydraulic pump 98 which is coupled to a hydraulic fluid reservoir 100. The hydraulic pump 98 is powered by any suitable means, such as by the power takeoff transmission 72. In such manner, the agitating members 66 are rotatably driven so as to cause stirring of the bark mulch contained in the holding chamber 28 of the hopper 24 to promote the gravity flow of the bark mulch toward the auger 26 along the bottom portion 28B of the hopper 24.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A bark mulch handling and spreading apparatus, comprising:

(a) a platform adapted to be mounted on a mobile chassis;

(b) means mounted on said platform for receiving bark mulch and conveying bark mulch to an outlet port of said receiving and conveying means;

(c) at least one blower mechanism mounted on said platform adjacent to said receiving and conveying means for generating a flow of air past said outlet port of said receiving and conveying means so as to entrain in the flow of air the bark mulch being discharged from said outlet port;

(d) a spreading mechanism mounted on said platform adjacent to said receiving and conveying means and adapted to receive the flow of air with entrained bark mulch from said outlet port of said receiving and conveying means and to distribute the air flow entrained bark mulch to a selected discharge location, said spreading mechanism including an upright discharge tube and an upper distributing spout rotatably mounted to said upright discharge tube and extending outwardly therefrom in a transverse relation thereto, said upright discharge tube having an inflow end in communication with said outlet port of said receiving and conveying means for receiving a bark mulch entrained upward flow of air therefrom, said upright discharge tube also having an outflow end displaced above said inflow end and connected to said upper distributing spout for expelling air flow entrained bark mulch into said upper distributing spout for distribution therefrom to the discharge region; and (e) a drive arrangement mounted on said platform for driving said receiving and conveying means and said blower mechanism;

(f) said receiving and conveying means including (i) a hopper having a pair of oppositely inclined side walls and a pair of front and rear end walls extending between and connected to said side walls and together therewith defining a bark mulch holding chamber having a top portion with an inlet opening for receiving bark mulch and a bottom portion, said outlet port formed in said rear end wall adjacent to and aligned with said bottom portion of said chamber, said chamber being wider at said top portion than at said bottom portion for promoting gravity flow of bark mulch from said top portion downwardly to said bottom portion, (ii) an elongated auger rotatably mounted along said bottom portion of said chamber of said hopper, said auger having a discharge end disposed at said outlet port of said hopper and being adapted to convey bark mulch through said chamber to said outlet port of said hopper, and (iii) a plurality of agitating members each having an elongated shaft rotatably mounted at opposite ends to said hopper and extending across said chamber thereof above said auger, each of said agitating members also having a plurality of stirring elements mounted to and spaced along the respective shaft, a first group of said agitating members extending substantially parallel to said auger, a second group of said agitating members extending transverse to said auger, said first and second groups of agitating members being disposed at different elevations across said chamber of said hopper.

2. The apparatus of claim 1 further comprising:

means coupled to said agitating members for driving said agitating members to cause stirring of the bark mulch contained in said chamber of said hopper to promote the gravity flow of the bark mulch toward said bottom portion of said hopper.

3. The apparatus of claim 1 wherein said blower mechanism includes:

a rotatable fan disposed in an adjacent spaced relation to a front end of said receiving and conveying means opposite from said outlet port thereof and being operable to generate a flow of air; and an elongated transport pipe coupled to said fan and extending to an opposite rear end of said receiving and conveying means adjacent to said outlet port thereof, said pipe being adapted to route the flow of air from said fan to said outlet port of said receiving and conveying means.

4. A bark mulch handling and spreading apparastus, comprising:

(a) a platform adapted to be mounted on a mobile chassis;

(b) means mounted on said platform for receiving bark mulch and conveying bark mulch to an outlet port of said receiving and conveying means;

(c) at least one blower mechanism mounted on said platform adjacent to said receiving and conveying means for generating a flow of air past said outlet port of said receiving and conveying means so as to entrain in the flow of air the bark mulch being discharged from said outlet port;

(d) a spreading mechanism mounted on said platform adjacent to said receiving and conveying means and adapted to receive the flow of air with entrained bark mulch from said outlet port of said receiving and conveying means and to distribute the air flow entrained bark mulch to a selected discharge location, said spreading mechanism including an upright discharge tube and an upper distributing spout rotatably mounted to said upright discharge tube and extending outwardly therefrom in a transverse relation thereto, said upright discharge tube having an inflow end in communication with said outlet port of said receiving and conveying means for receiving a bark mulch entrained upward flow of air therefrom, said upright discharge tube also having an outflow end displaced above said inflow end and connected to said upper distributing spout for expelling air flow entrained bark mulch into said upper distributing spout for distribution therefrom to the discharge region; and (e) a drive arrangement mounted on said platform for driving said receiving and conveying means and said blower mechanism;

(f) said blower mechanism including (i) a pair of rotatable fans, each fan being disposed on said platform in an adjacent spaced relation to an end of said platform remote from said outlet port of said receiving and conveying means and adjacent to one of a pair of opposite sides of said platform and being operable to generate the flow of air, and (ii) a pair of elongated transport pipes, each transport pipe being coupled at one end to one of said fans and extending along one of said pair of opposite sides of said platform to an opposite end of said platform adjacent to said outlet port of said receiving and conveying means such that opposite ends of the transport pipes located adjacent to said outlet port of the hopper approach said outlet port from opposite directions and below said outlet port so that said transport pipes are adapted to route separate flows of air from said respective fans to below said outlet port of said receiving and conveying means.

5. The apparatus of claim 4 wherein said receiving and conveying means includes:

a hopper having a pair of oppositely inclined side walls and a pair of front and rear end walls extending between and connected to said side walls and together therewith defining a bark mulch holding chamber having a top portion with an inlet opening for receiving bark mulch and a bottom portion, said outlet port formed in said rear end wall adjacent to and aligned with said bottom portion of said chamber, said chamber being wider at said top portion than at said bottom portion for promoting gravity flow of bark mulch from said top portion downwardly to said bottom portion; and an elongated auger rotatably mounted along said bottom portion of said chamber of said hopper, said auger having a discharge end disposed at said outlet port of said hopper and being adapted to convey bark mulch through said chamber to said outlet port of said hopper.

6. The apparatus of claim 5 further comprising:

a hollow enclosure mounted on said platform and extending between and in communication with said outlet port of said hopper and said inflow end of said upright discharge tube of said spreading mechanism, said hollow enclosure receiving said discharge end of said auger extending from said hopper through said outlet port thereof and adapted to guide the bark mulch from said auger in said chamber of said hopper to said inflow end of said upright discharge tube where the bark mulch becomes entrained in said upward flow of air from said blower mechanism passing into said upright discharge tube of said spreading mechanism.

7. The apparatus of claim 5 further comprising:

a plurality of agitating members each having an elongated shaft rotatably mounted at opposite ends to said hopper and extending across said chamber thereof above said auger, each of said agitating members also having a plurality of stirring elements mounted to and spaced along the respective shaft, a first group of said agitating members extending substantially parallel to said auger, a second group of said agitating members extending transverse to said auger, said first and second groups of agitating members being disposed at different elevations across said chamber of said hopper.

8. The apparatus of claim 4 wherein said spreading mechanism further has an operator steering control portion mounted to said upright discharge tube and extending outwardly in the opposite direction from said upper distributing spout and in transverse relation to said upright discharge tube.

9. The apparatus of claim 8 wherein said operator steering control portion includes a seat and handle bars.

10. A bark mulch handling and spreading apparatus, comprising:

(a) a platform adapted to be mounted on a mobile chassis;

(b) means mounted to said platform for receiving and conveying bark mulch to an outlet port of said receiving and conveying means;

(c) at least one blower mechanism mounted on said platform adjacent to said receiving and conveying means, said blower mechanism including (i) a rotatable fan disposed in an adjacent spaced relation to a front end of said receiving and conveying means opposite from said outlet port thereof and being operable to generate a flow of air, and (ii) an elongated transport pipe coupled to said fan and extending to an opposite rear end of said receiving and conveying means adjacent to said outlet port thereof, said pipe being adapted to route the flow of air from said fan past said outlet port of said receiving and conveying means;

(d) a spreading mechanism mounted on said platform adjacent to said receiving and conveying means and adapted to receive the flow of air with entrained bark mulch from said outlet port of said receiving and conveying means and to distribute the air flow entrained bark mulch to a selected discharge location; and (e) a drive arrangement mounted on said platform for driving said receiving and conveying means and said fan of said blower mechanism;

(f) said receiving and conveying means including (i) a hopper having a pair of oppositely inclined side walls and a pair of front and rear end walls extending between and connected to said side walls and together therewith defining a bark mulch holding chamber having a top portion with an inlet opening for receiving bark mulch and a bottom portion, said outlet port formed in said rear end wall adjacent to and aligned with said bottom portion of said chamber, said chamber being wider at said top portion than at said bottom portion for promoting gravity flow of bark mulch from said top portion downwardly to said bottom portion, (ii) an elongated auger rotatably mounted along said bottom portion of said chamber of said hopper, said auger having a discharge end disposed at said outlet port of said hopper and being adapted to convey bark mulch through said chamber to said outlet port of said hopper, (iii) a plurality of agitating members each having an elongated shaft rotatably mounted at opposite ends to said hopper and extending across said chamber thereof above said auger, each of said agitating members also having a plurality of stirring elements mounted to and spaced along the respective shaft, a first group of said agitating members extending substantially parallel to said auger, a second group of said agitating members extending transverse to said auger, said first and second groups of agitating members being disposed at different elevations across said chamber of said hopper, and (iv) means coupled to said agitating members for driving said agitating members to cause stirring of the bark mulch contained in said chamber of said hopper to promote the gravity flow of the bark mulch toward said bottom portion of said hopper.

11. The apparatus of claim 10 wherein said spreading mechanism includes an upright discharge tube and an upper distributing spout rotatably mounted to said upright discharge tube and extending outwardly therefrom in a transverse relation thereto, said upright discharge tube having an inflow end in communication with said outlet port of said receiving and conveying means for receiving a bark mulch entrained upward flow of air therefrom, said upright discharge tube also having an outflow end displaced above said inflow end and connected to said upper distributing spout for expelling air flow entrained bark mulch into said upper distributing spout for distribution therefrom to the discharge region.

12. The apparatus of claim 11 wherein said spreading mechanism further has an operator steering control portion mounted to said upright discharge tube and and extending outwardly in the opposite direction from said upper distributing spout and in transverse relation to said upright discharge tube.

13. The apparatus of claim 12 wherein said operator steering control portion includes a seat and handle bars.

14. A bark mulch handling and spreading apparatus, comprising:

(a) a platform adapted to be mounted on a mobile chassis;

(b) a hopper mounted to said platform and having a pair of oppositely inclined side walls and a pair of front and rear end walls extending between and connected to said side walls and together therewith defining a bark mulch holding chamber having a top portion with an inlet opening for receiving bark mulch, a bottom portion, and an outlet port formed in said rear end wall adjacent to and aligned with said bottom portion of said chamber, said chamber being wider at said top portion than at said bottom portion for promoting gravity flow of bark mulch from said top portion downwardly to said bottom portion;

(c) an elongated auger rotatably mounted along said bottom portion of said chamber of said hopper, said auger having a discharge end disposed at said outlet port of said hopper and being adapted to convey bark mulch through said chamber to said outlet port of said hopper;

(d) a plurality of agitating members each having an elongated shaft rotatably mounted at opposite ends to said hopper and extending across said chamber thereof above said auger, each of said agitating members also having a plurality of stirring elements mounted to and spaced along the respective shaft, a first group of said agitating members extending substantially parallel to said auger, a second group of said agitating members extending transverse to said auger, said first and second groups of agitating members being disposed at different elevations across said chamber of said hopper;

(e) at least one blower mechanism mounted on said platform adjacent to said hopper for generating a flow of air past said outlet port of said hopper so as to entrain in the flow of air the bark mulch being discharged from said outlet port;

(f) a spreading mechanism mounted on said platform adjacent to said hopper and adapted to receive a bark mulch entrained flow of air from said outlet port of said hopper and to distribute said bark mulch entrained air flow to a selected discharge location; and (g) a drive arrangement mounted on said platform for driving said auger, said agitating members and said blower mechanism.

15. The apparatus of claim 14 wherein said blower mechanism includes:

a rotatable fan disposed in an adjacent spaced relation to said front end wall of said hopper and being operable to generate a flow of air; and an elongated transport pipe coupled to said fan and extending to said rear end wall of said hopper adjacent to said outlet port thereof, said pipe being adapted to route said flow of air from said fan to said outlet port of said hopper.

16. The apparatus of claim 14 wherein said blower mechanism includes:

a pair of rotatable fans, each fan being disposed on said platform in an adjacent spaced relation to an end of said platform remote from said outlet port of said receiving and conveying means and adjacent to one of a pair of opposite sides of said platform and being operable to generate the flow of air; and a pair of elongated transport pipes, each transport pipe being coupled at one end to one of said fans and extending along one of said pair of opposite sides of said platform to an opposite end of said platform adjacent to said outlet port of said receiving and conveying means such that opposite ends of the transport pipes located adjacent to said outlet port of the hopper approach said outlet port from opposite directions and below said outlet port so that said transport pipes are adapted to route separate flows of air from said respective fans to below said outlet port of said receiving and conveying means.

17. The apparatus of claim 14 wherein said spreading mechanism includes fan upright discharge tube and an upper distributing spout rotatably mounted to said upright discharge tube and extending outwardly therefrom in a transverse relation thereto, said discharge tube having an inflow end in communication with said outlet port of said hopper for receiving a bark entrained upward flow of air therefrom, said discharge tube also having an outflow end displaced above said inflow end and connected to said upper distributing spout for expelling the air flow entrained bark mulch into said upper distributing spout for distribution therefrom to the discharge region.

18. The apparatus of claim 17 further comprising:

a hollow enclosure mounted on said platform and extending between and in communication with said outlet port of said hopper and said inflow end of said upright discharge tube of said spreading mechanism, said hollow enclosure receiving said discharge end of said auger extending from said hopper through said outlet port thereof and adapted to guide the bark mulch from said auger in said chamber of said hopper to said inflow end of said upright discharge tube where the bark mulch becomes entrained in said upward flow of air from said blower mechanism passing into said upright discharge tube of said spreading mechanism.

19. The apparatus of claim 17 wherein said spreading mechanism has an operator steering control portion mounted to said upright discharge tube and extending outwardly in the opposite direction from said upper distributing spout and in transverse relation to said upright discharge tube, said operator and steering control portion including a seat and handle bars.

* * * * *